Figure 1:
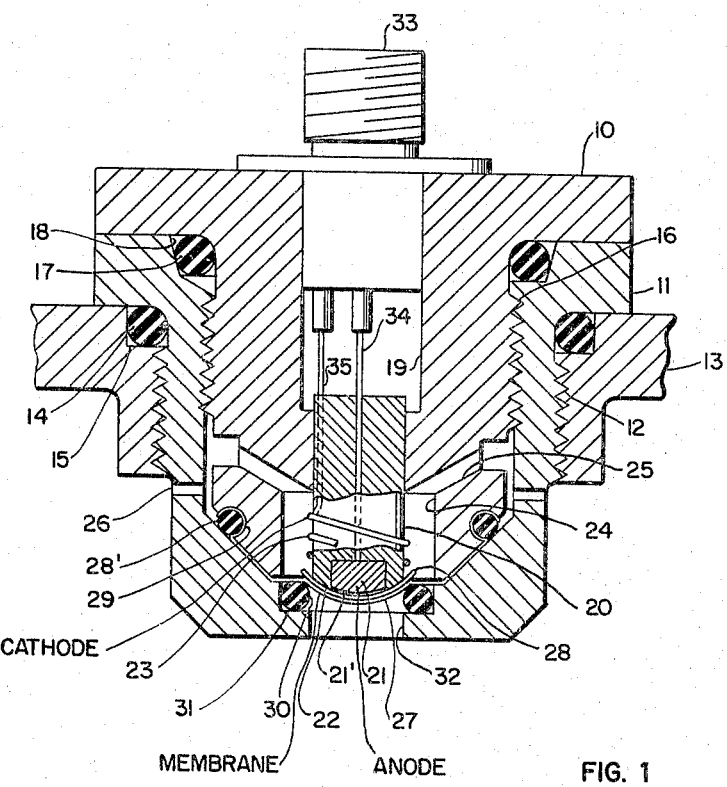

INVENTORS
MALBONE W. GREENE
BY RAY I. WILSON

ATTORNEY

United States Patent Office 3,325,378
Patented June 13, 1967

---

3,325,378
ELECTROCHEMICAL METHOD AND APPARATUS FOR MEASURING HYDROGEN CONTENT
Malbone W. Greene, Covina, and Ray I. Wilson, La Habra, Calif., assignors to Beckman Instruments, Inc., a corporation of California
Filed Apr. 10, 1964, Ser. No. 358,960
12 Claims. (Cl. 204—1)

This application is a continuation-in-part of our co-pending application entitled, "Electrochemical Cell," filed June 4, 1963, Ser. No. 285,364, now abandoned, assigned to the same assignee as the present application.

This invention relates to electrochemical cells and, in particular, to cells for measuring the hydrogen content of a sample.

High pressure hydrogen is commonly used in chemical process streams, for filling large electric generators to aid in cooling and to reduce friction, as a rocket fuel, and in nuclear reactor corrosion control systems. In these applications, hydrogen presents a serious explosion hazard when mixed with air in quantities between 4 and 74% by volume and it burns with nearly an invisible flame when a continuous leak is ignited. Thus, there is an urgent need for a simple and positive hydrogen detector which is specific to hydrogen and provides sufficient sensitivity to detect the presence of hydrogen well below the lower explosion limit of 4% hydrogen in air.

Some of the methods that are currently used for determination of hydrogen are: gas chromatography, mass spectrometry, thermal conductivity, catalytic combustion in a bed, and catalytic combustion on a filament. While mass spectrometers and gas chromatographs can be highly specific to the presence of hydrogen, they are rather complex instruments and are not suitable for field use. Thermal conductivity sensors will respond to any composition or pressure change in the background gas and thus are not selective to only hydrogen gas in a sample. Catalytic combustion sensors will give false responses with the presence of any other combustible material in a sample. Furthermore, none of the above methods are generally suitable for incorporation in small probes that could be used to search confined spaces for hydrogen leaks. What is needed then is a hydrogen detector that is specific to hydrogen in air and can be made extremely small in size, with low power requirements and sufficient stability for use in field installations.

Although a hydrogen detector has not been devised before the present invention which meets the above-mentioned requirements, oxygen detectors are known which meet the above requirements for detecting oxygen in a sample of air or the like. Such detectors are electrochemical cells which comprise a pair of electrodes joined by an electrolyte and separated from the sample media to be analyzed by means of a membrane that is permeable to oxygen in the sample, but is nonpermeable to the electrolyte. Such a cell is described in United States Patent No. 2,913,386 to Leland C. Clark, Jr. Generally cells of this type are referred to as polarographic cells. In these cells the anode is generally formed of silver-silver chloride while the cathode is made of platinum or gold. A suitable electrical potential is impressed between the electrodes to reduce all the oxygen passing through the membrane at the cathode. Suitable voltages when using a silver-silver chloride anode are about 0.6 to 0.9 volt. In the absence of the constituents in the sample that is to be analyzed, the electrode system becomes polarized so that the current which normally flows through the electrolyte is reduced to nearly zero after a short time. In the presence of the constituent in the sample that is to be analyzed, namely oxygen, the electrode system becomes depolarized and the current flows again. The magnitude of the current in these devices is a function of the rate or speed with which the oxygen in the sample media passes through the membrane and of the diffusion process that takes place in the immediate vicinity of the system, particularly the membrane.

The principal object of the present invention is to provide an electrochemical cell generally of the above-mentioned type which is capable of detecting hydrogen in a sample media.

Another object of the present invention is to provide a hydrogen detector which is highly specific to hydrogen and can be made extremely small in size with low power requirements.

According to the principal aspect of the present invention, it has been unexpectedly found that hydrogen may be detected with good response and stability by providing one electrode of an electrochemical cell of the general type described in the afore-mentioned Clark patent with an etched surface or surface layer of platinum black and by supplying said electrode with a positive electrical potential with respect to the standard hydrogen reference couple, which is sometimes referred to as the standard hydrogen reference potential.

Figure 2:
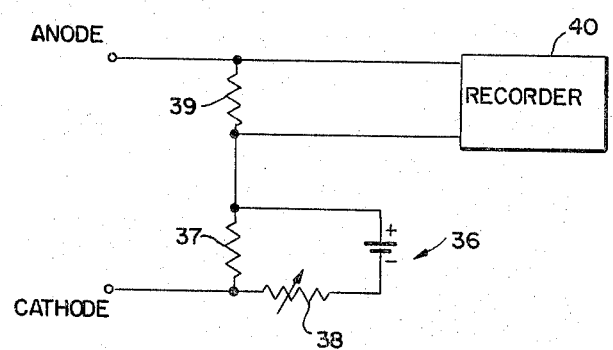

Other objects and aspects of the invention will become apparent from the following description taken in connection with the accompanying drawing wherein:

FIG. 1 is a partial sectional view of the electrochemical cell of the present invention; and FIG. 2 is a schematic diagram of a simple circuit in which the cell of FIG. 1 may be used.

A suitable construction of a detector or electrochemical cell for detecting hydrogen is illustrated in FIG. 1 in which there is shown a body member 10 mounted in a housing 11. The housing is adapted for insertion into a threaded opening 12 in the wall 13 of the container or line through which the sample passes if the detector is being used in an industrial process. It can be appreciated however, that if the detector is to be used as a portable device for detecting hydrogen in air or the like, the threads on the outer portion of housing 11 would not be necessary. An O-ring 14 is located in an annular recess 15 in the wall 13 providing a seal between the wall and housing 11.

The housing 11 is provided with the screw threaded opening 16 for receiving the body 10 preferably formed of an insulating material such as casting resin; however, the body may be made from metal such as stainless steel. An O-ring 17 is disposed in an annular recess 18 in the housing 11 for sealing the body 10 from the housing.

The body 10 is provided with a central bore 19 in which there is mounted in the lower portion an electrode base structure 20 which may be secured to the body 10 by an adhesive or any other suitable means. The electrode base 20 is provided with an anode 21 which has at least a portion thereof formed of platinum. In one embodiment of the invention, the anode may be platinum having a surface which has been etched electrolytically in saturated KCl or the like. The etched surface provides good response and stability. In a preferred embodiment of the invention, the platinum anode, rather than being etched, is provided with a layer 21′ of platinum black thereby providing a platinized platinum electrode. The platinum black may be deposited on the platinum substrate by any conventional electrolytical plating process. Such an electrode provides somewhat better response to changes in hydrogen concentrations in a sample and a more stable output than the etched platinum electrode. It also has been found that a platinized gold anode may be used in place of the platinized platinum anode and comparable results will be obtained. The platinized gold anode has the advantage of being less expensive than the platinized platinum anode.

It has further been discovered that a gold anode coated with a surface layer of platinum black and rhodium provides faster and more accurate response to changing levels of hydrogen than any of the above-mentioned electrodes. The platinum black and rhodium may either be deposited electrolytically in two layers on the gold substrate, with the platinum black being the outer layer, or by depositing a mixture of these substances on the gold substrate as a single layer. Also, an anode having a base of rhodium with a surface coating of platinum black provides the same favorable results as the gold anode coated with platinum black and rhodium. Not only do these electrodes having rhodium as one of their ingredients have faster response to changing hydrogen levels than platinum or gold platinized electrodes, they also maintain their sensitivity to hydrogen for a longer period of time than the other electrodes.

The anode is disposed in the lower portion of the electrode space and its outer surface or face 22 is flush with the outer surface of the electrode base 20. The electrode base structure is also formed of an insulating material and is provided at its outer cylindrical surface with a cathode 23 preferably made of silver wire that is coated with a layer of silver chloride. A connector 33 is mounted on the top of body 10 for connecting a cable electrically to the electrodes 21 and 23 via wires 34 and 35, respectively. The body 10, at its lower portion, is provided with a recess 24 that provides an electrolyte space or reservoir. Suitable electrolytes which may be used in the cell are buffered sodium chloride or potassium chloride solutions. An example of a suitable electrolyte composition is 3% KCl, 20% pH 4 buffer, 2 to 4% carboxymethyl cellulose gelling agent and a trace of Butaben to discourage the growth of algae. One or more passages 25 may be provided through the lower portion of body 10 to allow any excess electrolyte to be removed from the electrolyte space. Similarly, one or more passages 26 may be provided from the space between the housing 11 and the lower portion of the body 10 to the area through which a sample passes to permit an equalization of pressures within and without the electrochemical cell.

Overlying the anode 21 and the lower portion of the electrode base 20 is a membrane 27 which is permeable to gases including hydrogen but impermeable to electrolyte. A preferred material for this membrane is polytetrafluoroalkane such as "Teflon," however, materials such as polyethylene and polypropylene could be used. A porous spacer 28 may be positioned between the outer face 22 of the anode and the membrane 27, but is not essential to the operation of the cell. The membrane 27 is fastened to the assembly by means of an O-ring 28' located in an annular recess 29 in the lower portion of body 10. An additional O-ring may be carried in an annular recess 31 in the housing 11 to provide additional clamping pressure on the membrane when the housing is affixed to the body. An opening 32 in the bottom of the housing 11 provides flow communication between the sample being analyzed and the membrane 27 of the cell. A suitable thickness for the "Teflon" membrane 27 is about 0.001 inch.

In operation of the invention, when hydrogen is present in an atmospheric sample or the like, the hydrogen diffuses through the membrane 27 into the electrolyte joining the electrodes 21 and 23. A predetermined electrical potential is impressed across the electrodes causing the following reactions to take place:

At the anode, 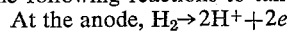
At the cathode, 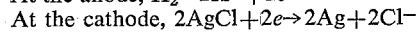

The potential is chosen such that the platinum anode polarizes in the absence of hydrogen and essentially no current flows through the detector. When hydrogen diffuses into the electrolyte in contact with the anode, it depolarizes the cell, permitting current to flow as the hydrogen is converted to hydrogen ion. The potential must be high enough to oxidize hydrogen at the anode and to prevent or minimize the reduction of oxygen to $OH^-$ ions, but not so high as to evolve oxygen from the anode due to oxidation of $OH^-$ ions, as this would introduce a positive "zero," or blank current. Reduction of oxygen introduces a negative zero current. This requires that the anode be supplied with a positive electrical potential with respect to the standard hydrogen reference couple defined in pages 2 and 3 of Oxidation Potentials, second edition, by Wendell M. Latimer and sometimes referred to as the standard hydrogen reference potential. It is noted that the polarity convention employed in this description is opposite to that adopted by Latimer. By this convention, the potential of an Ag-AgCl electrode, with unit activities of reactants and reaction products, is +0.222 volt on the standard hydrogen reference scale.

A critical relationship exists with regard to potential supplied to the electrodes. This involves such parameters as the anode material and the electrolyte composition. When using an electrolyte containing 0.5 M KCl buffered to pH 7, the anode is preferably polarized between about 0.4 and 0.5 volt positive with respect to the Ag-AgCl cathode. This potential corresponds to about 0.65 to 0.75 volt on the standard hydrogen reference scale. When using the same electrolyte buffered to pH 4 the preferred polarizing voltage has different tolerances, being between about 0.3 and 0.5 volt with respect to the Ag-AgCl cathode, or about 0.55 and 0.75 volt on the standard hydrogen reference scale. If the concentration of KCl is reduced to 0.01 molar, the preferred anode voltage is about 0.2 to 0.4 volt for electrolytes buffered at pH 7, and about 0.2 to 0.6 volt for electrolytes buffered at pH 4. On the standard hydrogen reference scale these potentials correspond to a positive potential range of about 0.4 to 0.85 volt. The types of ions and their concentrations are, therefore, important considerations in practicing this invention. The principal condition is, as stated above, that the anode potential be high enough to oxidize $H_2$ readily, and to minimize the reduction of $O_2$, but low enough to minimize the oxidation of hydroxyl ions to $O_2$. A secondary consideration, which may become important at higher applied anode potentials, is that the platinum itself may be slowly dissolved by formation of $PtCl_4^=$ and $PtCl_6^=$. According to Latimer (supra), at standard conditions this reaction has an equilibrium potential of about 0.73 volt on the standard hydrogen couple reference scale. Reducing the chloride ion concentration to an activity of 0.01 would increase this potential by about 240 millivolts. Hence, it is advantageous to lower the chloride ion concentration to permit operation at a higher anode potential when measuring hydrogen in the presence of large partial pressures of oxygen, which may produce negative current if the polarizing voltage is too low.

A suitable circuit which has been used with the electrochemical cell in FIG. 1 of the drawing is shown schematically in FIG. 2. The circuit includes a 1.34 volt battery 36 in a voltage divider circuit comprising a 500 ohm resistor 37 and a 2.5 kilohm variable resistor 38 which may be used to vary the voltage delivered to the electrodes. The negative terminal of the battery 36 is connected to the cathode 23 whereas the positive terminal of the battery is connected to the anode 21 through a resistor 39 which may have a resistance of a few ohms up to a few megohms, depending upon the desired sensitivity to $H_2$, and other circuit parameters. A high impedance device such as a recorder or the like used for observing the electrical output current of the electrochemical cell is connected across the resistor 39. It should be appreciated that the values of the resistors given above are given by way of example only and not by way of limitation. By using the above circuit an electrical potential of 0.2 to 1.34 volts with respect to the Ag-AgCl electrode may be impressed across the electrodes 21 and 23, with the voltage of the platinum anode being positive with respect to the cathode.

By providing an anode having a diameter of 0.04 inch coated with platinum black, a Teflon membrane of 0.001 inch thickness, an electrolyte containing .5 M KCl and pH 4 buffer, and Ag-AgCl cathode and a voltage applied to the electrodes of 0.4 volt, the response of the detector has been found to be linear to ±1% from $10^{-4}$ to 5 atmospheres partial pressure of hydrogen in a sample. The electrochemical cell has been very readily capable of detecting the hydrogen content in air, $N_2$, He, A, $CH_4$, etc., down to the limits of zero to 4% concentration and, with special precautions, can detect as little as 100 parts per million of $H_2$. It has also been found that other gases in a sample such as water vapor, nitrogen, oxygen, and carbon dioxide as well as the inert gases and saturated hydrocarbons do not interfere with the determination of hydrogen by the detector of this invention. Furthermore, the detector is not dependent upon the presence of gaseous $O_2$, as is the case with catalytic combustion devices.

When the detector is immersed in an aqueous solution saturated with $H_2$, the signal from the detector is nearly that given by the same detector in $H_2$ gas as atmospheric pressure. Thus, as stated before, the detector of the present invention may be used to monitor nuclear reaction corrosion control systems in which an excess of dissolved hydrogen must be maintained.

Although the invention has been described as a system in which a predetermined electrical potential is impressed across the electrodes 21 and 23, it should be appreciated that by a judicious selection of the electrode materials, the electrodes themselves could provide a battery action, automatically applying a potential to the anode high enough to oxidize hydrogen to hydrogen ion and to prevent the reduction of oxygen to hydroxyl ion, but low enough to prevent oxidation of hydroxyl ion to oxygen, thereby providing a polarographic cell according to the invention which is self-energized. With such a cell, the circuit shown in FIG. 2 may be simplified to the extent that the battery 36 and resistors 37, 38 and (in some cases) 39 could be eliminated and the cell lead wires connected directly to a recorder, galvanometer or other suitable device for observing the changes in current carrying capacity of such a self-energized cell. The resistor 39 may also be replaced with a temperature compensating network. For example, a thermistor may be used directly or with series and/or shunt resistors, to make the increase in cell current with temperature produce a negligible effect upon the voltage developed across load resistor 39. The cell current increase with temperature appears to be primarily due to an increase in membrane permeability to $H_2$. For 0.001 inch Teflon, the effect is usually about 3% per degree centigrade.

These and other changes can be made in the form, details, arrangement and proportions of the various parts in the embodiments of the invention disclosed herein without departing from the spirit and scope of the invention as defined by the appended claims.

What is claimed is:

1. In a cell for polarographic analysis of hydrogen in a sample, the combination of:
   a pair of spaced electrodes, one of said electrodes being formed of gold with a first layer of rhodium and a second layer of platinum black on top of said first layer;
   a membrane permeable to gas and impermeable to electrolyte carried by said cell and positioned with respect to said electrodes to define a space adapted to be filled with electrolyte for joining said electrodes; and
   means coupled to said electrodes for impressing a predetermined electrical potential across said electrodes, said means supplying a positive electrical potential to said one of said electrodes with respect to the standard hydrogen reference couple.

2. In a cell for polarographic analysis of hydrogen in a sample, the combination of:
   a pair of spaced electrodes, one of said electrodes being formed of gold with a surface layer of a mixture of platinum black and rhodium;
   a membrane permeable to gas and impermeable to electrolyte carried by said cell and positioned with respect to said electrodes to define a space adapted to be filled with electrolyte for joining said electrodes; and
   means coupled to said electrodes for impressing a predetermined electrical potential across said electrodes, said means supplying a positive electrical potential to said one of said electrodes with respect to the standard hydrogen reference couple.

3. In a cell for polarographic analysis of hydrogen in a sample, the combination of:
   a pair of spaced electrodes, one of said electrodes being formed of rhodium with a surface layer of platinum black;
   a membrane permeable to gas and impermeable to electrolyte carried by said cell and positioned with respect to said electrodes to define a space adapted to be filled with electrolyte for joining said electrodes; and
   means coupled to said electrodes for impressing a predetermined electrical potential across said electrodes, said means supplying a positive electrical potential to said one of said electrodes with respect to the standard hydrogen reference couple.

4. In a cell for polarographic analysis of hydrogen in a sample, the combination of:
   a gold anode electrode with a first layer of rhodium and a second layer of platinum black on top of said first layer and a cathode electrode spaced from said anode electrode; and
   a membrane permeable to gas and impermeable to electrolyte carried by said cell and positioned with respect to said electrodes to define a space adapted to be filled with electrolyte for joining said electrodes.

5. In a cell for polarographic analysis of hydrogen in a sample, the combination of:
   a gold anode electrode with a surface layer of a mixture of platinum black and rhodium and a cathode electrode spaced from said anode electrode; and
   a membrane permeable to gas and impermeable to electrolyte carried by said cell and positioned with respect to said electrodes to define a space adapted to be filled with electrolyte for joining said electrodes.

6. In a cell for polarographic analysis of hydrogen in a sample, the combination of:
   a rhodium anode electrode with a surface layer of platinum black and a cathode electrode spaced from said anode electrode; and
   a membrane permeable to gas and impermeable to electrolyte carried by said cell and positioned with respect to said electrodes to define a space adapted to be filled with electrolyte for joining said electrodes.

7. A method for polarographic analysis of hydrogen in a sample comprising the steps of:
   providing a pair of spaced electrodes with one of the electrodes having a surface selected from the group consisting of etched platinum and platinum black;
   joining said electrodes with an electrolyte;
   separating said electrodes and electrolyte from the sample by a membrane which is permeable to gas and impermeable to electrolyte; and
   supplying a positive electrical potential to said one of said electrodes with respect to the standard hydrogen reference couple, said potential being sufficiently high to readily oxidize hydrogen and to minimize the reduction of oxygen to hydroxyl ions at said one of said electrodes but sufficiently low to minimize the oxidation of hydroxyl ions to oxygen.

8. A method as set forth in claim 7 wherein said one of said electrodes is formed of platinum with a surface layer of platinum black.

9. A method as set forth in claim 7 wherein said one of said electrodes is formed of gold with a surface layer of platinum black.

10. A method as set forth in claim 7 wherein the other of said electrodes is formed of silver coated with silver chloride.

11. A method as set forth in claim 7 wherein said electrical potential is from 0.4 to 0.85 volt.

12. A method as set forth in claim 10 wherein said electrical potential is from 0.2 to 0.6 volts with respect to the silver-silver chloride electrode.

References Cited

UNITED STATES PATENTS

| | | | |
|---|---|---|---|
| 2,882,212 | 4/1959 | Beard | 204—195 |
| 2,913,386 | 7/1959 | Clark | 204—195 |
| 3,000,804 | 9/1961 | Cahoon et al. | 204—195 |
| 3,003,932 | 10/1961 | Frey et al. | 204—195 |
| 3,022,241 | 2/1962 | Jessop | 204—195 |
| 3,038,848 | 6/1962 | Brewer et al. | 204—195 |
| 3,103,481 | 9/1963 | Robinson | 204—195 |
| 3,223,609 | 12/1965 | Reeds | 204—195 |

OTHER REFERENCES

Ives et al., "Reference Electrode," 1961, pages 108 and 109.

JOHN H. MACK, *Primary Examiner.*

T. TUNG, *Assistant Examiner.*